United States Patent
Oi

(10) Patent No.: US 7,778,969 B2
(45) Date of Patent: Aug. 17, 2010

(54) INFORMATION-PROCESSING APPARATUS AND METHOD FOR PROCESSING DOCUMENT

(75) Inventor: Hirokazu Oi, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 371 days.

(21) Appl. No.: 11/143,258

(22) Filed: Jun. 2, 2005

(65) Prior Publication Data
US 2005/0273699 A1 Dec. 8, 2005

(30) Foreign Application Priority Data
Jun. 7, 2004 (JP) .............................. 2004-169154

(51) Int. Cl.
G06F 17/00 (2006.01)
G06F 15/16 (2006.01)
(52) U.S. Cl. ...................... 707/613; 709/206; 717/173
(58) Field of Classification Search ................. 707/200, 707/104.1, 613; 709/221, 206; 1/1; 717/173
See application file for complete search history.

(56) References Cited
U.S. PATENT DOCUMENTS

| | | | | |
|---|---|---|---|---|
| 5,898,836 A | * | 4/1999 | Freivald et al. | 709/218 |
| 5,978,842 A | * | 11/1999 | Noble et al. | 709/218 |
| 6,012,087 A | * | 1/2000 | Freivald et al. | 709/218 |
| 6,029,175 A | * | 2/2000 | Chow et al. | 707/104.1 |
| 6,088,707 A | * | 7/2000 | Bates et al. | 715/235 |
| 6,219,818 B1 | * | 4/2001 | Freivald et al. | 714/799 |
| 6,681,369 B2 | * | 1/2004 | Meunier et al. | 715/255 |
| 2002/0120725 A1 | * | 8/2002 | DaCosta et al. | 709/221 |
| 2002/0184619 A1 | * | 12/2002 | Meyerson | 717/173 |
| 2003/0046351 A1 | * | 3/2003 | Maruyama et al. | 709/206 |
| 2003/0172113 A1 | * | 9/2003 | Cameron et al. | 709/204 |
| 2003/0184784 A1 | * | 10/2003 | Ferlitsch | 358/1.13 |
| 2004/0030741 A1 | * | 2/2004 | Wolton et al. | 709/202 |
| 2004/0098413 A1 | * | 5/2004 | Peng | 707/200 |
| 2005/0086270 A1 | * | 4/2005 | Shimizu et al. | 707/200 |

* cited by examiner

*Primary Examiner*—Tony Mahmoudi
*Assistant Examiner*—Dennis Truong
(74) *Attorney, Agent, or Firm*—Canon USA Inc IP Division

(57) ABSTRACT

A document processing apparatus is provided to facilitate document management concerning update and registration of documents. The document processing apparatus includes a destination-obtaining unit for analyzing a document and obtaining destination information from the analyzed document and a notification unit for notifying a destination based on the obtained destination information. The destination is notified about a registration or an update of the document stored in a storage device.

15 Claims, 14 Drawing Sheets

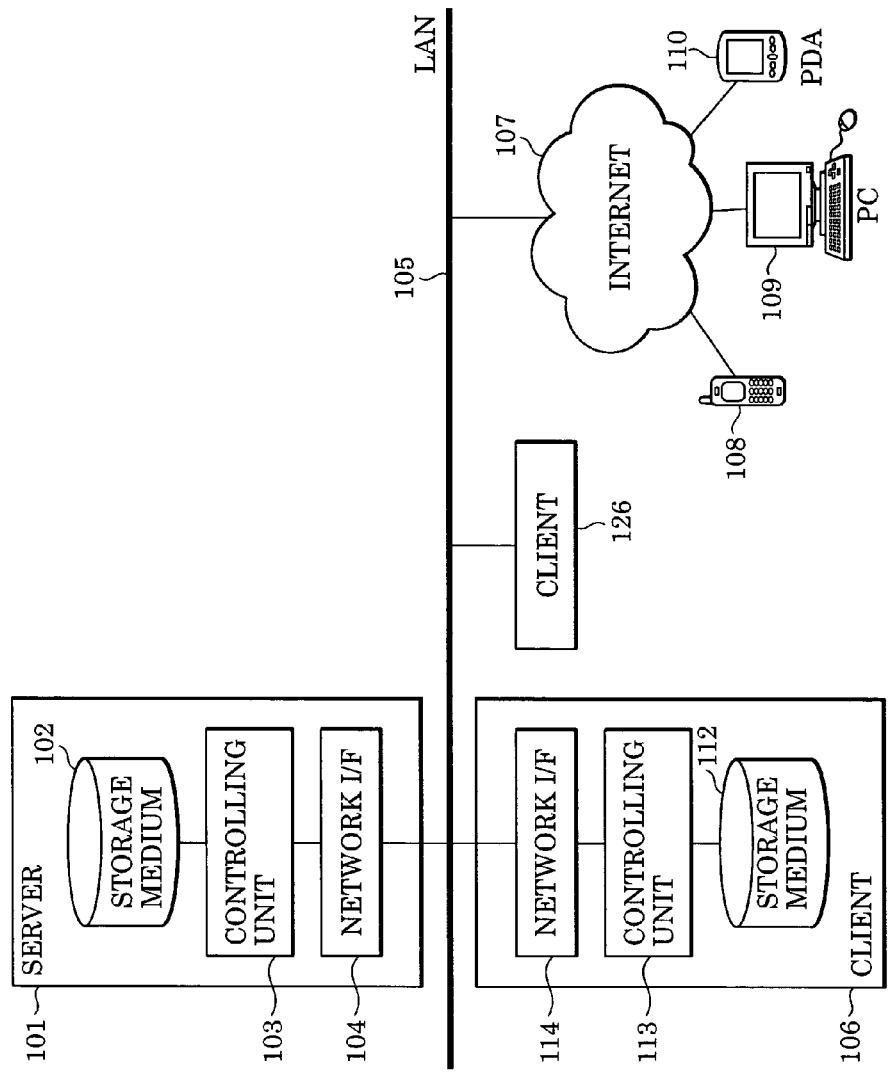

FIG. 2

```
<?xml version="1.0"?>
<!DOCTYPE doc[
...
]>
```
201 — `<doc>`
202 — `<title> DIGITAL CAMERA X3 INSTRUCTION MANUAUL</title>`
203 — `<chapter id= "introduction">`
`<title> INTRODUCTION </title>`
`<para>...</para>`
...
`</chapter>`
204 — `<chapter id="lets_get_started">`
`<title> GETTING STARTED </title>`
`<para>...</para>`
...
`</chapter>`
205 — `<chapter id="advance usage">`
`<title> ADVANCED FUNCTIONS </title>`
`<para>...</para>`
206 — `<img src="img/sample1.jpg"alt="SAMPLE IMAGE 1"/>`
...
`</chapter>`
207 — `<notification`
`    xmlns:xlink="http://w3.org/1999/xlink"`
`    xlink:type="extended">`
208 — `<mailed_to>sato@abc.com</mailed_to>`
209 — `<mailed_to>suzuki@abc.com</mailed_to>`
210 — `<mailed_to_with_document>saito@abc.com</mailed_to_with_document>`
211 — `<mailed_to_doc_ref="http://www.xyz.com/X3/manual.html">tanaka@abc.com<mailed_to>`
212 — `<mailed_to if_updated="#introduction">sasaki@hijk.co.jp</mailed_to>`
213 — `<mailed_to if_updated="#xpointer(/doc/chapter[2]/rang-to(/doc/chapter[3]))">`
`watanabe@xyz.com</mailed_to>`
214 — `<mailed_to if_updated="resource" xlink:type="locator"xlink:href="img/sample1.jpg">`
`iwata@xyz.com.</mailed_to>`
`<notification>`
`</doc>`

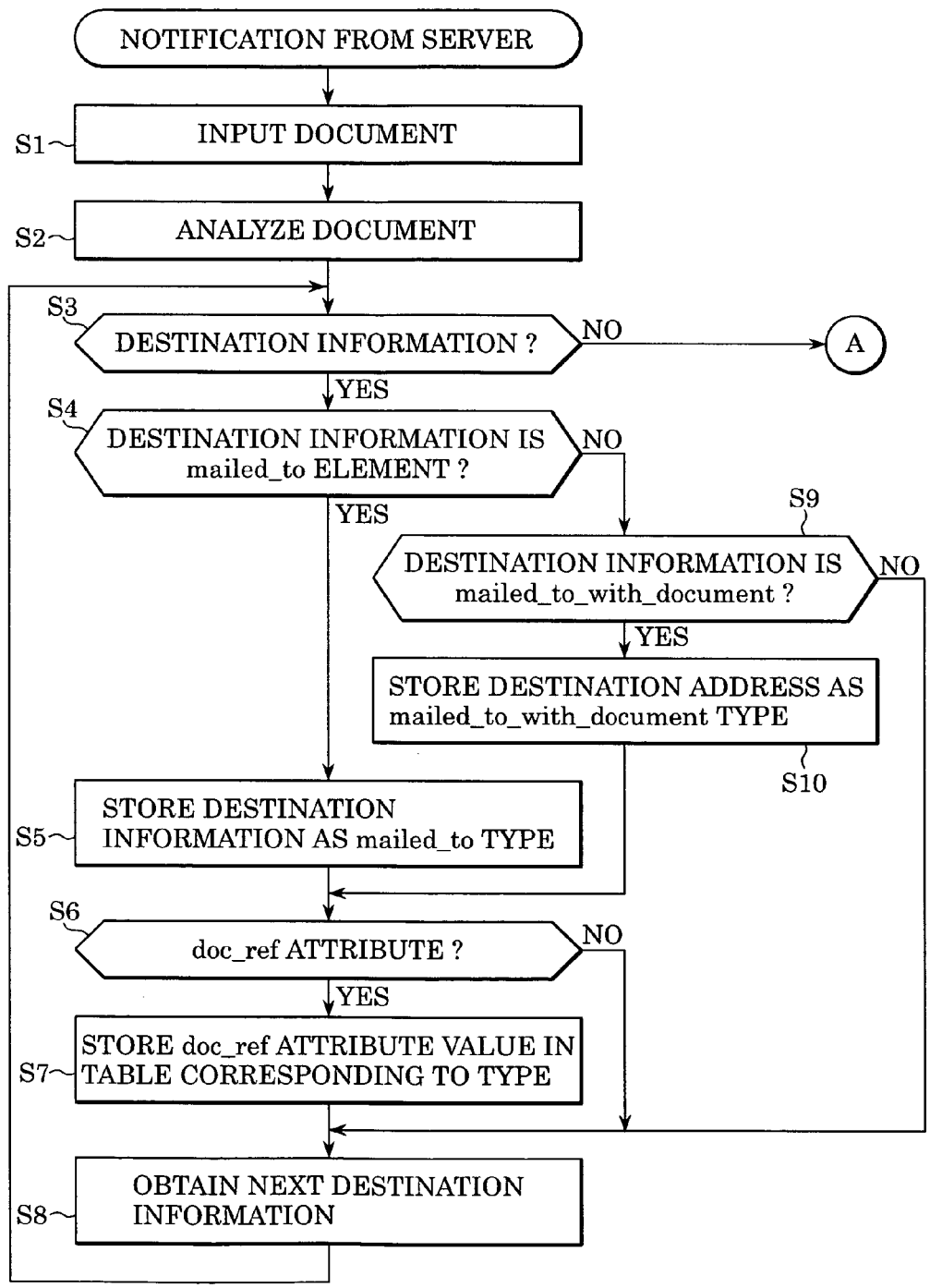

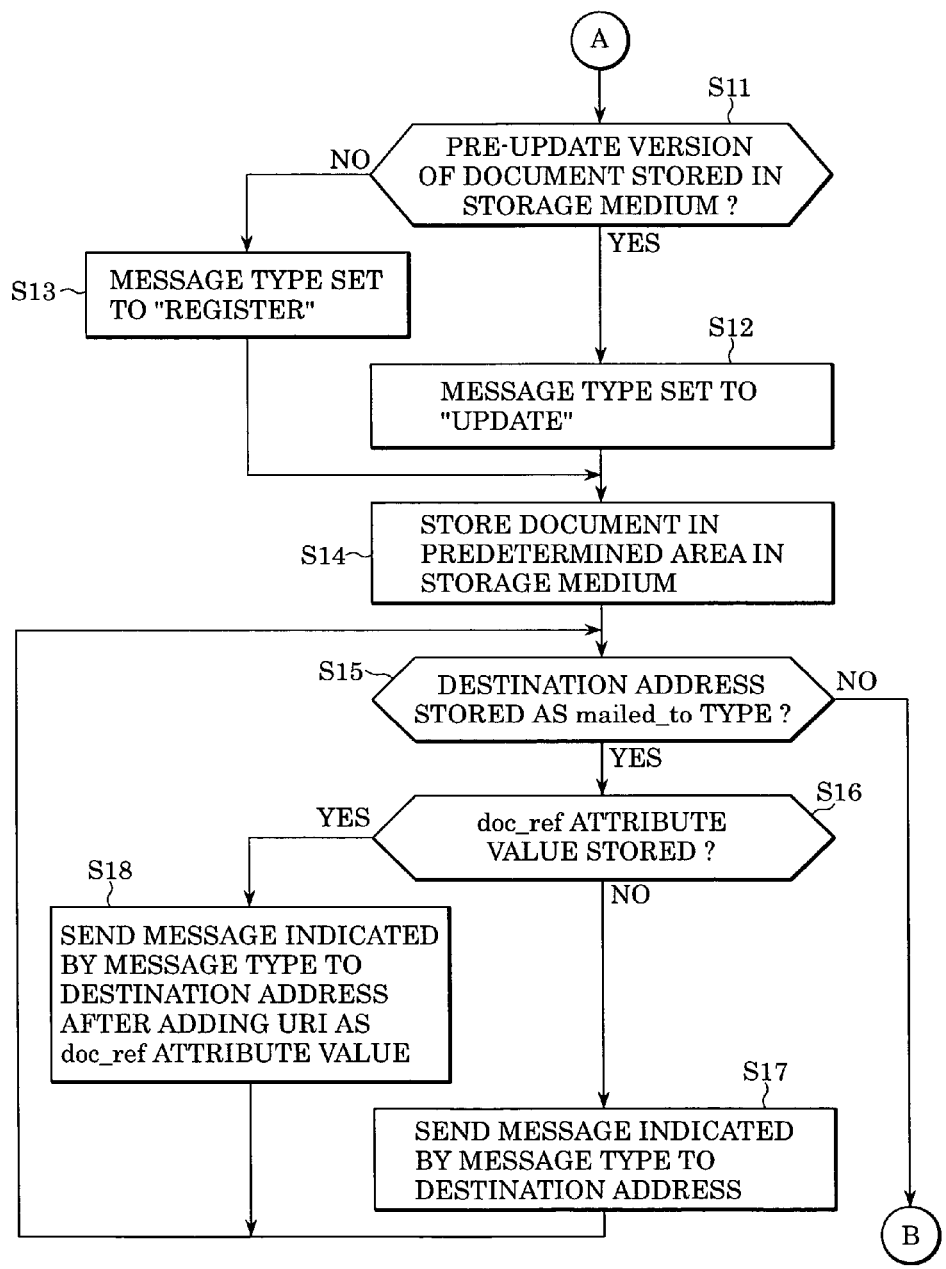

FIG. 6

| mailed_to_ TYPE DESTINATION ADDRESS | doc_ref |
|---|---|
| sato@abc.com | |
| suzuki@abc.com | |
| tanaka@abc.com | http://www.xyz.com/X3/manual.html |
| ... | ... |

FIG. 7

| mailed_to_with_document TYPE DESTINATION ADDRESS | doc_ref |
|---|---|
| saito@abc.com | |
| ota@abc.com | |
| koizumi@abc.com | http://www.xyz.com/X3/manual.html |
| ... | ... |

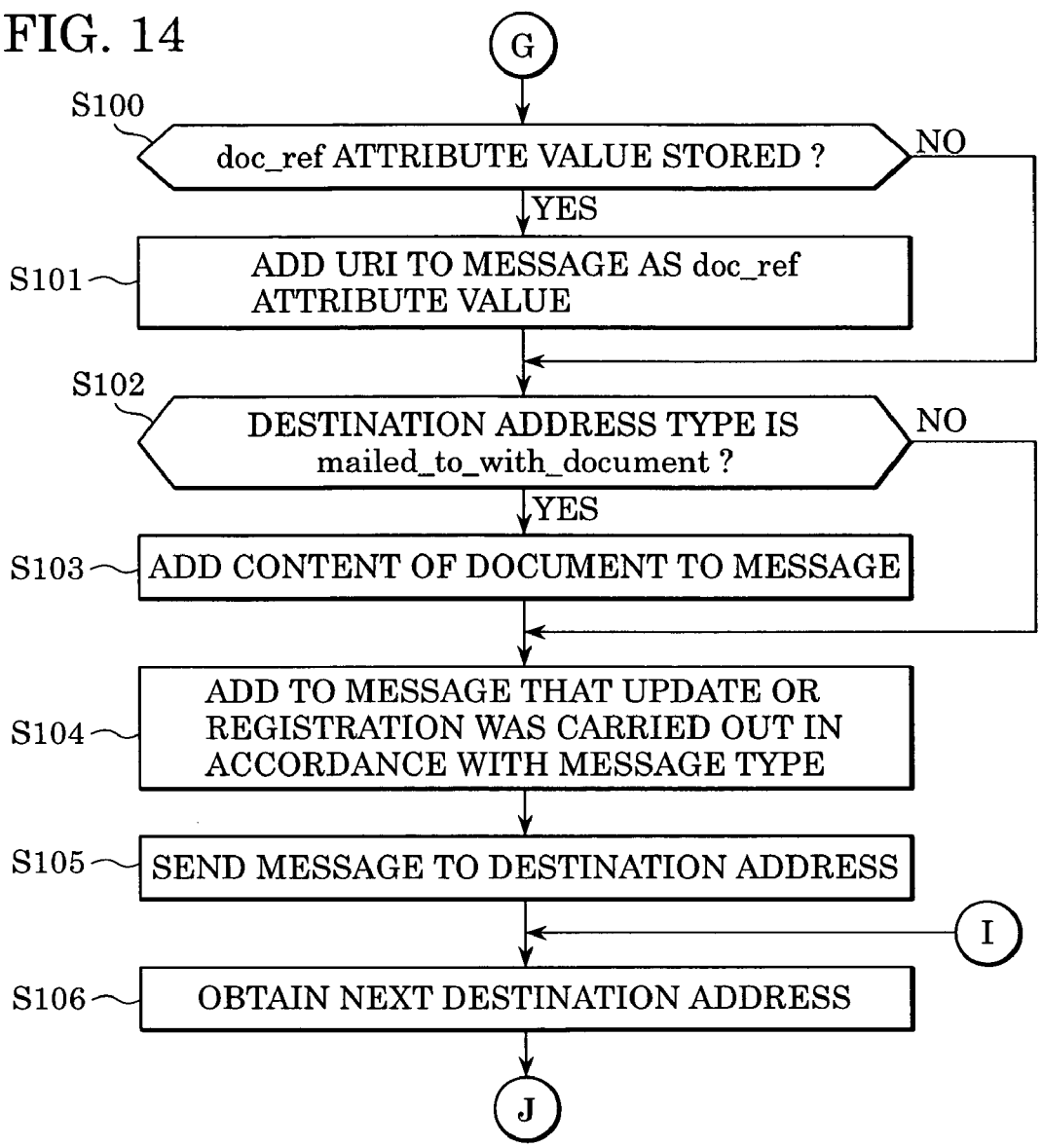
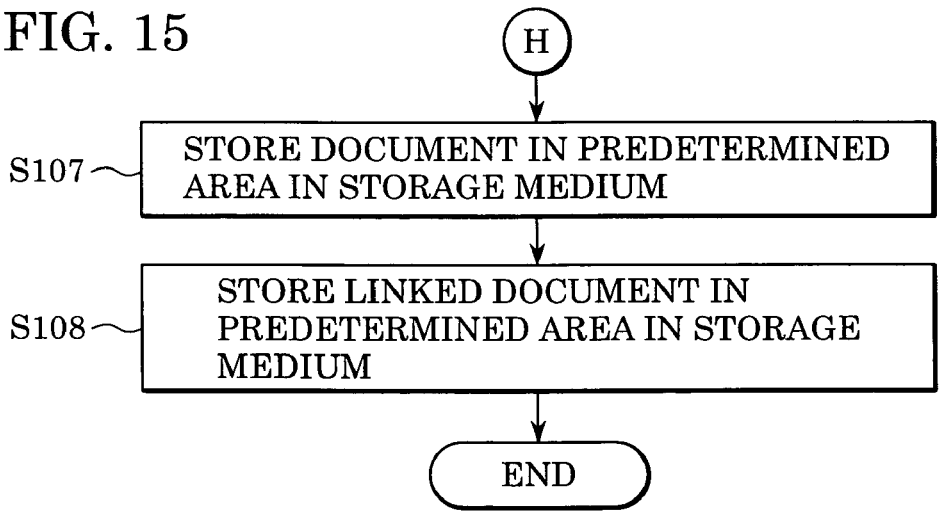

FIG. 16

| DESTINATION ADDRESS | TYPE | doc_ref | if_updated 1 | if_updated 2 | ... |
|---|---|---|---|---|---|
| sato@abc.com | mailed_to | | | | |
| suzuki@abc.com | mailed_to | | | | |
| saito@abc.com | mailed_to_with_document | | | | |
| tanaka@abc.com | mailed_to | http://www.xyz.com/X3/manual.html | | | |
| sasaki@hijk.com | mailed_to | | #introduction | | |
| watanabe@xyz.com | mailed_to | | #xpointer(/doc/chapter[2]range-to(/doc/chapter[3])) | | |
| iwata@xyz.com | mailed_to | | "resource" xlink:href="img/sample1.jpg" | | |

INFORMATION-PROCESSING APPARATUS AND METHOD FOR PROCESSING DOCUMENT

BACKGROUND OF THE INVENTION

1. Field of the Invention

The present invention relates to an information-processing apparatus and a method for processing a document and notifying a user about a registration or an update of the document if the document has been registered or updated.

2. Description of the Related Art

Known computer systems capable of storing data referred to by users are also capable of notifying users about an update of the stored data. The stored data may include document data, spreadsheet data, web pages, and a combination of these various types of data. Hereinafter, any of these various types of data is collectively referred to as a "document."

The above-described known technology requires complicated management of destination information of users to be notified. Another disadvantage of known technology is that, for example, when a web page is updated, it is impossible to determine in detail the users who should be notified about the update. It might be possible to categorize these users by using known technology, but in such a case, the users who should be notified about the update cannot be selected in accordance with the updated web page of a web site.

SUMMARY OF THE INVENTION

The embodiments of the present invention provide a method for processing a document and destination information such that the destinations are informed about a registration or an update of the document.

The embodiments of the present invention provide an information-processing apparatus and a method for processing a document and determining whether a predetermined region of the document has been updated and whether predetermined users should be notified when there is an update.

According to an aspect of the present invention, a document-processing apparatus for processing a document includes a destination-obtaining unit configured to analyze a document and obtain destination information from the analyzed document, and a notification unit configured to notify a destination based on the obtained destination information, the destination being notified about a registration or an update of the document stored in a storage device.

According to another aspect of the present invention, a method for processing a document includes steps of analyzing a document, obtaining destination information from the analyzed document, and notifying a destination based on the obtained destination information about a registration or an update of the document stored in a storage device.

According to another aspect of the present invention, a document processing program carries out a method for processing a document including steps of analyzing a document, obtaining destination information from the analyzed document and notifying a destination based on the obtained destination information. Here, the destination is notified about a registration or an update of the document stored in a storage device.

Further features and advantages of the present invention will become apparent from the following description of exemplary embodiments (with reference to the attached drawings).

BRIEF DESCRIPTION OF THE DRAWINGS

FIG. 1 illustrates the structure of a client server system according to a first embodiment of the present invention.

FIG. 2 illustrates an XML document.

FIGS. 3-5 illustrate a flow chart for a notification process by a server device when a document is sent from a client device to the server device.

FIG. 6 is a mailed_to type table including destination addresses.

FIG. 7 is a mailed_to_with_document type table.

FIGS. 11-15 illustrate a flow chart for a notification process by a server device according to a third embodiment of the present invention.

FIG. 16 is a table indicating destination addresses.

DESCRIPTION OF THE EMBODIMENTS

Figure 5:
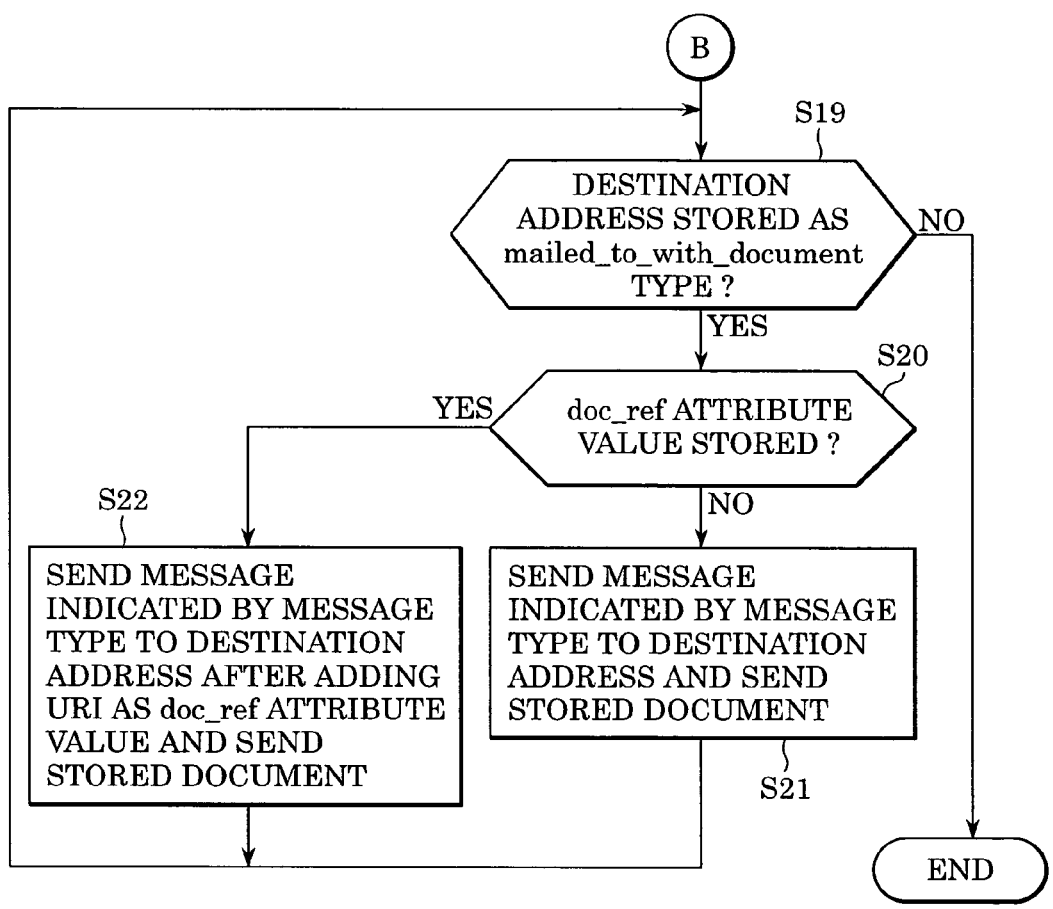

An information-processing apparatus and a method for processing a document according to embodiments of the present invention will be described with reference to the drawings. The information-processing apparatus according to the present invention is included in a client server system.

First Embodiment

FIG. 1 illustrates the structure of a client server system according to the first embodiment of the present invention. The client server system according to the first embodiment includes a server device 101 and a plurality of client devices 106 and 126 connected via a network (e.g., a local area network (LAN)) 105. The LAN 105 is connected to the Internet 107. Many devices such as a mobile phone 108, a personal computer (PC) 109, and a personal digital assistance (PDA) 110 are connected to the Internet 107.

The server device 101 includes a storage medium 102, a controlling unit 103, and a network interface (I/F) 104 and is capable of storing various types of documents. The storage medium 102 may be, for example, a hard disk, a random access memory (RAM), a read only memory (ROM), other disk units, or memory units, or some combination thereof. The storage medium 102 stores the document together with various application programs, an operating system, and operational data.

The controlling unit 103 executes the programs stored in the storage medium 102 and controls the server device 101. The network I/F 104 is an interface for connecting to the LAN 105. As described above, the LAN 105 is connected to the server device 101 and the client devices 106 and 126. Each of the client devices 106 and 126 also includes a storage medium 112, a controlling unit 113, and a network I/F 114 and operates in a similar manner to the server device 101.

According to this embodiment, a document is not limited to a text document. A document may be or may include multimedia data, such as an image file (e.g., a GIF image file). Since the content of a document according to this embodiment may include destination information, data having a format that does not allow additional information to be embedded into the original data is not considered a document according to this embodiment. An extensible markup language (XML) document is described as an exemplary document for this embodiment. However, other document formats can be used.

FIG. 2 illustrates an XML document. The first line of this XML document (hereafter simply referred to as "document") is an XML declaration (beginning with "<?xml" and ending with "?>") indicating that the document is a document conforming to XML standards established by the World Wide Web Consortium (W3C).

The elements and attributes that appear in the tagged data in the document are declared in the document type definition (DTD) (beginning with "<!DOCTYPE" and ending with "]>"). Descriptions of the content of the DTD are omitted since it is not related with the essence of the present invention. In an actual document, the elements and attributes described below may not be declared. Moreover, the DTD is not essential for an XML document and may be omitted.

In the next line of the document, a doc element 201, which is a root element, is declared. The doc element 201 includes a title element 202 indicating the title of the document, chapter elements 203, 204, and 205 indicating the chapters of the document, and a notification element 207 indicating destination information.

The notification element 207 includes mailed_to elements 208, 209, and 211 and a mailed_to_with_document element 210. The mailed_to elements 208, 209, and 211 and the mailed_to_with_document element 210 include destination e-mail addresses (or simply referred to as "destination addresses"). These elements are provided with various attribute values.

According to this embodiment, the destination information is e-mail addresses. However, if an apparatus is to be notified, the destination information may be a machine address. Moreover, when a user is to be notified at his or her mobile phone 108, the mobile phone number may be the destination information. In other words, so long as the unit that analyzes the document can recognize the content of the elements and can send a notification, any type of information may be used as the destination information.

Although, in FIG. 1, the mobile phone 108 is connected to the Internet 107, the mobile phone 108 is also capable of receiving phone calls from a mobile phone network (not shown). In such a case, information is transmitted from the server device 101 to the mobile phone network and audio is synthesized and sent from the server device 101 to the mobile phone 108 while receiving a phone call from the mobile phone network.

FIGS. 3-5 are a flow chart illustrating the notification process by the server device 101 carried out when a document is sent from the client device 106 to the server device 101. The processing program is stored in the storage medium 102 in the server device 101 and is executed by the controlling unit 103.

The mechanism and the protocol that trigger the transmission of the notification are not limited. For example, commonly known protocols, such as hyper text transfer protocol (HTTP) or file transfer protocol (FTP), may be used. Instead, the client device 106 may execute a predetermined application and the server device 101 may execute another predetermined program for receiving the data sent from the program executed by the client device 106. In other words, the server device 101 receives a document and carries out the notification process illustrated in FIGS. 3-5.

The controlling unit 103 in the server device 101 receives a document from the client device 106 via the network I/F 104 (Step S1) and analyzes the received document (Step S2). The controlling unit 103 determines whether or not the received document is an XML document. If the document is an XML document, tagged data, elements, and attribute values included in the XML document are analyzed in accordance with the XML standards.

The controlling unit 103 determines whether or not unprocessed destination information is included in the document being analyzed (Step S3). For example, for the document illustrated in FIG. 2, when the controlling unit 103 finds a mailed_to element or a mailed_to_with_document element in the notification element, the controlling unit 103 determines that the document being analyzed includes destination information. The format of the destination information is not limited to the above-mentioned elements.

For example, if the input data is a GIF file and destination information is stored in an application expansion block, this information may be analyzed and used as the destination information. If destination information is found in Step S3, the controlling unit 103 determines whether or not the destination information is included in a mailed_to element (Step S4). If the destination information is included in a mailed_to element, the destination mail address obtained from this destination information is stored in a mailed_to type table (Step S5).

FIG. 6 is a mailed_to type table including registered destination addresses. The mailed_to type table is part of the data stored in the storage medium 102. For example, when the destination address sato@abc.com is obtained from the mailed_to element 208, shown in FIG. 2, it is registered to the mailed_to type table. On the other hand, if the destination information is determined not to be included in a mailed_to element in Step S4, the controlling unit 103 determines whether or not the destination information is included in a mailed_to_with_document element (Step S9).

If destination information is included in a mailed_to_with_document element, the destination address is stored in a mailed_to_with_document type table (Step S10). FIG. 7 shows a mailed_to_with_document type table. The mailed_to_with_document type table is part of the data stored in the storage medium 102. The structure of the table is the same as the mailed_to type table described above.

If, in Step S9, the destination information is not found in a mailed_to_with_document element, the destination information is ignored and the subsequent destination information is obtained (Step S8). Then the process returns to Step S3. The process is repeated until no more items of destination information remain for processing.

In Steps S5 and S10, the destination address is stored, and the controlling unit 103 determines whether or not the destination address includes a doc_ref attribute (Step S6). When a doc_ref attribute is found, the doc_ref attribute value is stored in the table corresponding to the type of the element (Step S7). Here, the type of the element is mailed_to or mailed_to_with_document, as described above. For example, in the case of the mailed_to element 211 in FIG. 2, the doc_ref attribute value "http://www.xyz.com/X3/manual.html" of the element is stored in the doc_ref attribute value column corresponding to the address, tanaka@abc.com, as illustrated in FIG. 6.

Here, a doc_ref attribute is provided to identify the resource of the document. In FIG. 2, the doc_ref attribute value is a uniform resource locator (URL). When a notification about a registration or an update of a document is sent to the destination address, the doc_ref attribute value, if included in the document, is also sent to the destination address. In this way, the user who is notified can easily know which document has been registered or updated.

According to this embodiment, the doc_ref attribute value is a URL. However, the doc_ref attribute value is not limited to a URL and may be a uniform resource identifier (URI) that identifies a resource in a more general way. By using a URI, the resource can be uniquely identified regardless of its physical location.

The doc_ref attribute value may be given by the client device 106 or by the server device 101. If the doc_ref attribute value has already been included in the document when the document is sent to the server device 101 in Step S1, the client device 106 has determined the doc_ref attribute value. The server device 101 can determine the doc_ref attribute value while it is analyzing the document in Step S2.

The client device 106 may determine the doc_ref attribute value by identifying the URL of the storage area of the document in the server device 101 or by identifying the URI, i.e., identifier, of the document. The server device 101 may determine the doc_ref attribute value in Step S2 by identifying the URL for the storage area in which the document is to be stored in Step S14. In either case, URIs include URLs. Therefore, unless otherwise specified, URIs will be used in the descriptions below.

After the doc_ref attribute value is stored in Step 7 or if a doc_ref attribute value is not found in Step S6, the subsequent destination information is obtained (Step S8). Then the process returns to Step S3 and the process is repeated until no more items of destination information remain for processing.

After all items of destination information are processed and no more items of destination information remain for processing in Step S3, the controlling unit 103 determines whether or not a pre-update version of the document is stored in the storage medium 102 (Step S11 in FIG. 4). If a pre-update version of the document is not stored in the storage medium 102, the process is recognized as a registration process of the document and the type of the notification message to be sent later in the process is set as "registration" (Step S13).

If a pre-update version of the document is stored in the storage medium 102 in Step S11, the process is recognized as an update of the document and the type of the notification message to be sent later in the process is set as "update" (Step S12). After the type of the message is set and stored (Step S12 or Step S13), the controlling unit 103 stores the document in a predetermined area in the storage medium 102 (Step S14).

Then, the controlling unit 103 determines whether a destination address is stored in the mailed_to type table (Step S15). If a destination address is stored, the controlling unit 103 determines whether a doc_ref attribute value is stored together with the destination address (Step S16). If so, the stored doc_ref attribute value, i.e., the URI, is added to a notification message prepared in accordance with the set message type. Then the notification message is sent to the destination address in process (Step S18). More specifically, if the message type for the document is "registration," a notification message including a text body such as "A new document has been registered. The URI of the document is . . . " will be sent to the destination address. Then the process is returned to Step S15.

If a doc_ref attribute value is not stored in Step S16, a notification message prepared in accordance with the set message type is sent to the destination address (Step S17). Then the process returns to Step S15. Notifying a newly registered document without providing the URI of the document is inconvenient for a user since it is difficult to locate the newly registered document. In such case in which a URI cannot be provided, the title of the document may be notified, such as the title element 202 illustrated in FIG. 2. Moreover, the URL of the document stored in the storage medium 102 in Step S14 may be determined and added to a notification message.

In this way, even without a doc_ref attribute, the user who has been notified about a registration or an update of a document can access the document according to the notified URL. After sending the notification message, the process returns to Step S15 and controlling unit 103 determines whether or not a subsequent destination address is stored in the mailed_to table. Through this loop process, all of the mailed_to destination addresses are processed.

In Step S15, the controlling unit 103 determines whether or not all of the mailed_to destination addresses have been processed. If there were no mailed_to destination addresses to start out with (no in Step S15), the controlling unit 103 determines whether a destination address is stored in the mailed_to_with_document type table (Step S19 of FIG. 5). If the mailed_to_with_document type table includes a destination address, then the controlling unit 103 determines whether a doc_ref attribute value is stored together with the destination address (Step S20). If so, the doc_ref attribute value, i.e., the URI, is added to a notification message prepared in accordance with the set message type and is sent together with the document stored in Step S14 to the destination address in process (Step S22).

More specifically, the document is sent as an attachment file of the notification e-mail message. Then the process returns to Step S19. If doc_ref attribute value is not found in Step S20, the notification message prepared in accordance with the set message type is sent together with the document stored in Step S14 to the destination address in process (Step S21). Then the process is returned to Step S19. As described above, instead of a doc_ref attribute, a title or a URL may be added to the notification message. After the notification message is sent together with the document, the process is returned to Step S19 and the controlling unit 103 determines whether a subsequent destination address is stored. Through this loop process, all mailed_to_with_document type destination addresses are processed.

The controlling unit 103 determines whether or not all mailed_to_with_document type destination addresses have been processed. If there were no mailed_to_with_document destination addresses to start out with (no in Step S19), the process is ended. A destination address specified in a mailed_to_with_document element receives the document itself together with a notification message, and thus, the user can immediately confirm the document.

The server device 101 according to the first embodiment of the present invention obtains destination information included in a document and sends a notification message to the destination address obtained from the destination information to notify that a document has been registered or updated. Accordingly, destination information for notifying a registration or an update of the document can be processed together with the document being registered or updated. Consequently, the document and destination information can be managed together and the document can be accessed and modified as necessary without interruption.

Second Embodiment

According to the second embodiment of the present invention, the client device 106 carries out the process for sending a notification message. Since the structure of the client server system according to the second embodiment of the present invention is the same the first embodiment, descriptions of the structure of the client server system are not repeated here.

Figure 8:
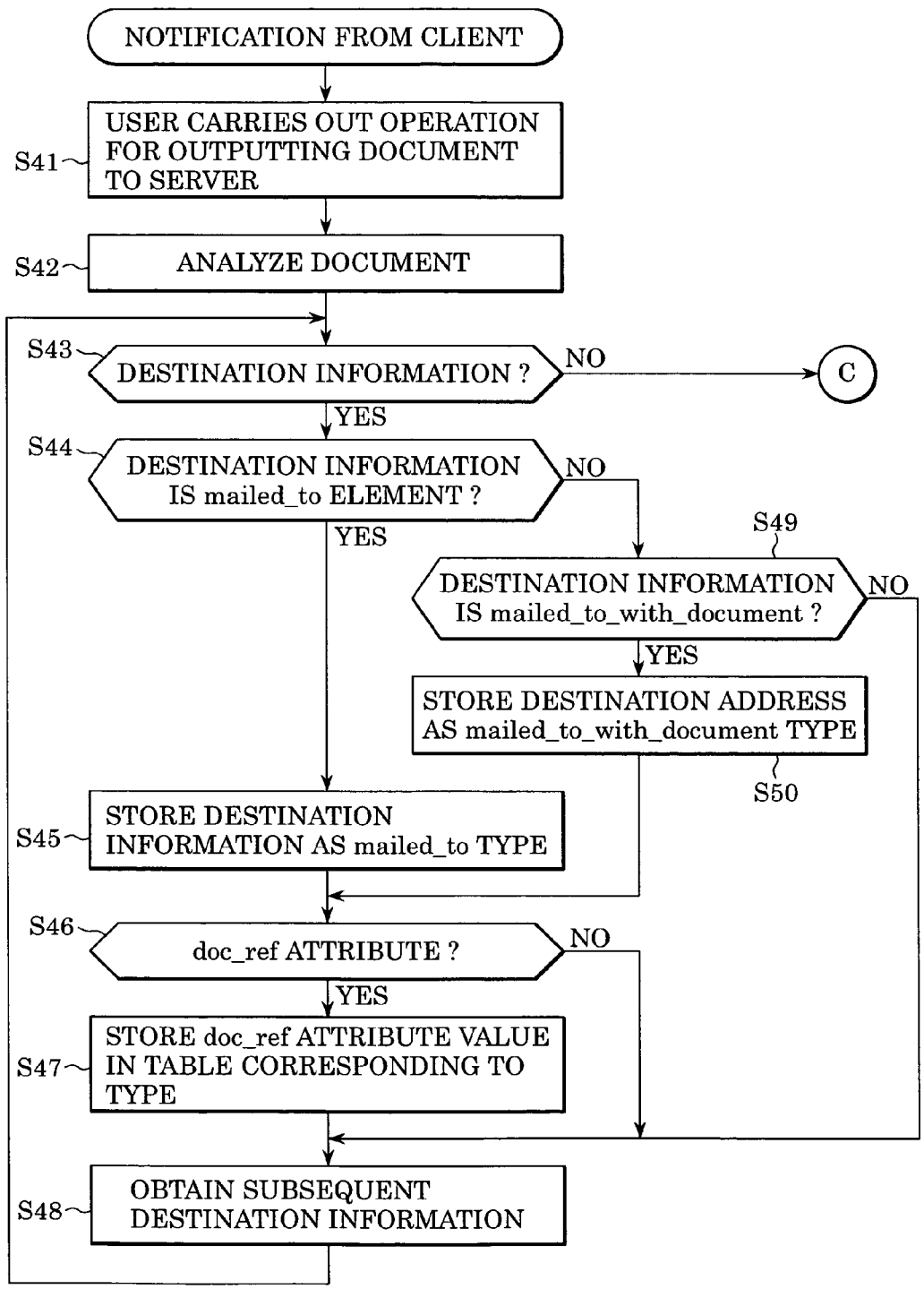
FIGS. 8-10 illustrate a flow chart for a notification process by a client device according to a second embodiment of the present invention.
Figure 9:
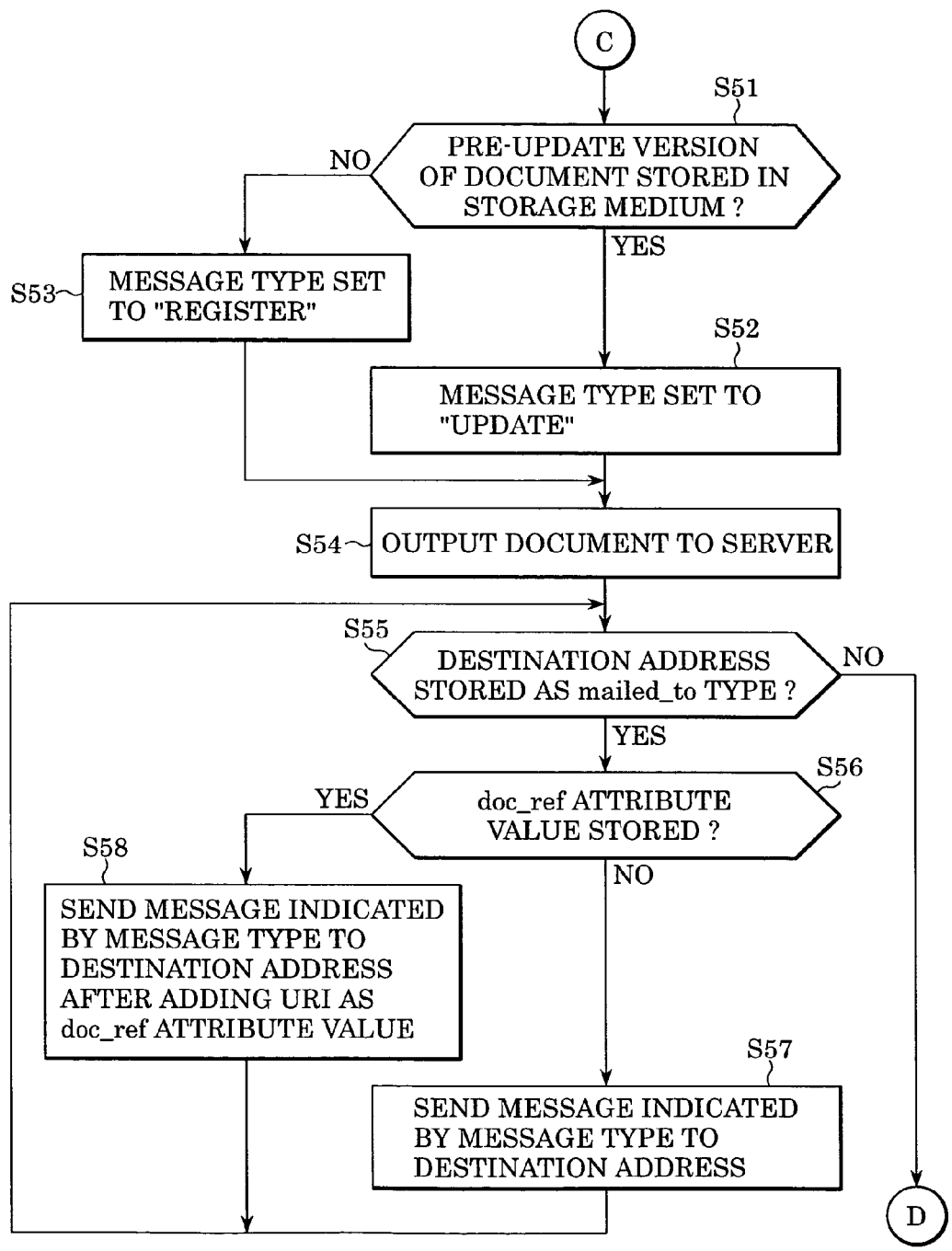
Figure 10:
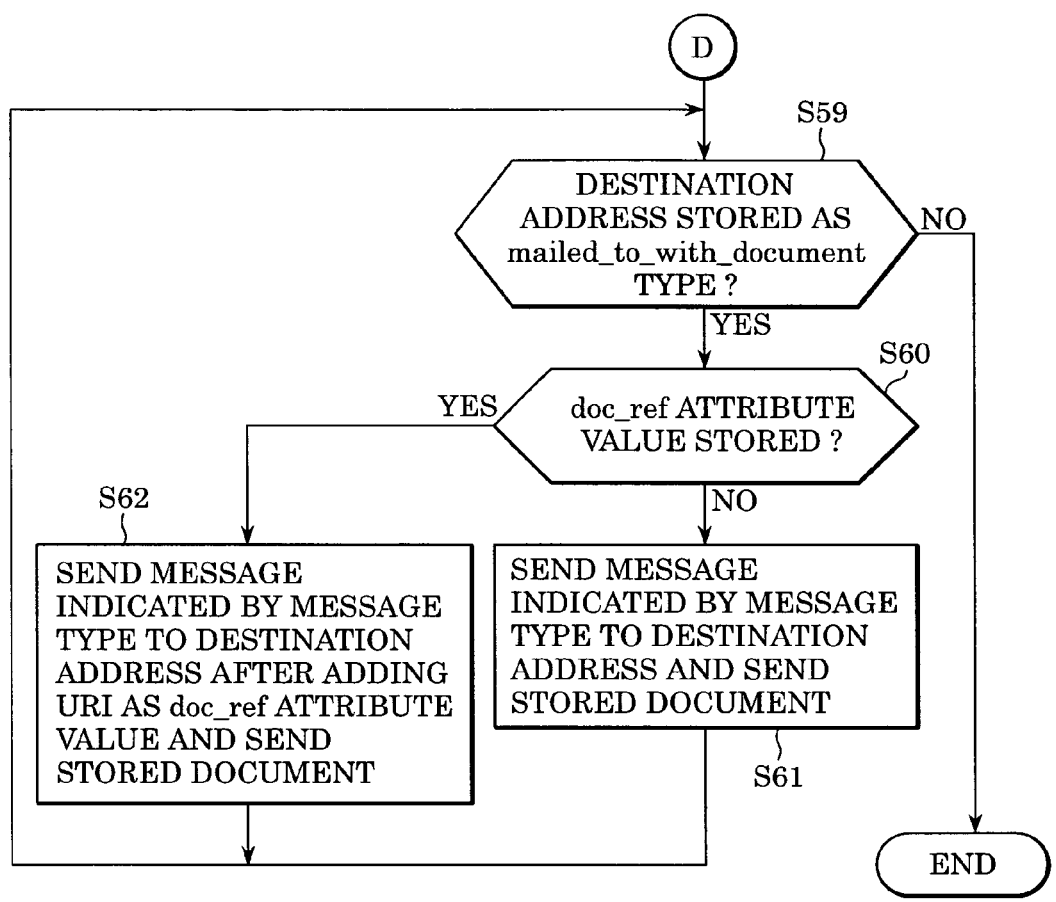
Figure 11:
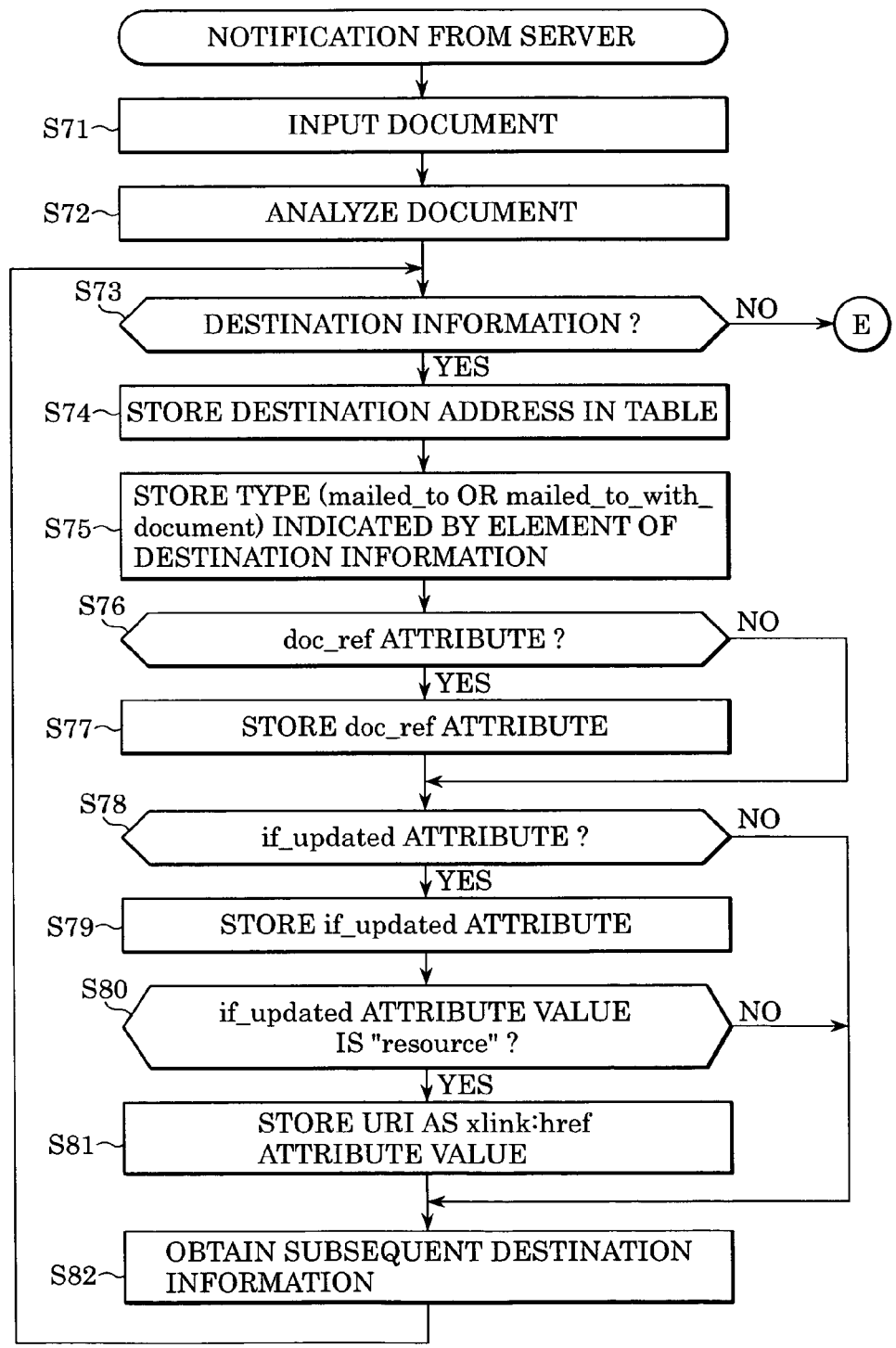

FIGS. 8-10 are a flow chart illustrating a process carried out by the client device 106 according to the second embodiment. This processing program is stored in the storage medium 112 in the client device 106 and is executed by the controlling unit 113. The controlling unit 113 is informed that a user has operated the client device 106 to output a document to the server device 101 (Step S41).

When this operation is carried out, the controlling unit 113 of the client device 106 analyzes the document before outputting it to the server device 101 (Step S42). The controlling unit 113 determines whether or not the document is an XML document. If the document is an XML document, tagged data, elements, and attribute values included in the XML document are analyzed in accordance with the XML standards. The analyzing process is carried out in Step S42 does not necessarily have to be carried out at this timing. The analyzing process may be carried out in Step S41 before carrying out the input operation or, if the document is edited, may be carried out while editing the document.

The controlling unit 113 determines whether unprocessed destination information is included in the document being analyzed (Step S43). For example, for the document illustrated in FIG. 2, when the controlling unit 113 finds a mailed_to element or a mailed_to_with_document element in a notification element, the controlling unit 113 determines that the document being analyzed includes destination information.

If destination information is found in Step S43, the controlling unit 113 determines whether the destination information is included in a mailed_to element (Step S44). If the destination information included is in a mailed_to element, the destination mail address obtained from this destination information is stored in a mailed_to type table (Step S45). The mailed_to type table is part of the data stored in the storage medium 112 of the client device 106. The format of the mailed_to type table is the same as the mailed_to type table described above with reference to FIG. 6.

On the other hand, if the destination information is determined not to be included in a mailed_to element in Step S44, the controlling unit 113 determines whether the destination information is included in a mailed_to_with_document element (Step S49). If destination information is included in a mailed_to_with_document element, the destination address is stored in a mailed_to_with_document type table (Step S50). FIG. 7 shows a mailed_to_with_document type table. The mailed_to_with_document type table is part of the data stored in the storage medium 112. The structure of the table is the same as the mailed_to_with_document type table described above with reference to FIG. 7.

If, in Step S49, the destination information is not found in a mailed_to_with_document element, the destination information is ignored and the subsequent destination information is obtained (Step S48). Then the process returns to Step S43. The process is repeated until no more items of destination information remain for processing.

In Steps S45 and S50, the destination address is stored, and the controlling unit 113 determines whether the destination address includes a doc_ref attribute (Step S46). When a doc_ref attribute is found, the doc_ref attribute value is stored in the table corresponding to the type of the element (Step S47). Here, the type of the element is mailed_to or mailed_to_with_document. In this process, the doc_ref attribute is determined by the client device 106.

After the doc_ref attribute value is stored (Step S47) or if a doc_ref attribute value is not present in Step S46, the subsequent destination information is obtained (Step S48). Then the process returns to Step S43 and is repeated until no more items of destination information remain for processing. After all items of destination information are processed and no more items of destination information remain for processing in Step S43, the controlling unit 113 in the client device 106 communicates with the server device 101 and determines whether a pre-update version of the document is stored in the server device 101 (Step S51 of FIG. 9). This process is carried out in accordance with a predetermined protocol.

If a pre-update version of the document is not stored in the server device 101, the process is recognized as a registration process of the document and the type of the notification message to be sent later in the process is set as "registration" (Step S53). If a pre-update version of the document is stored in the server device 101, the process is recognized as an update of the document and the type of the notification message to be sent later in the process is set as "update" (Step S52). After the type of the message is set and stored in Step S52 or S53, the controlling unit 113 in the client device 106 sends the document to the server device 101 (Step S54).

Then, the controlling unit 113 determines whether a destination address is stored in the mailed_to type table (Step S55). If a destination address is stored, the controlling unit 113 determines whether a doc_ref attribute value is stored together with the destination address (Step S56). If so, the stored doc_ref attribute value, i.e., the URI, is added to a notification message prepared in accordance with the set message type. Then the notification message is sent to the destination address in process (Step S58). Then the process is returned to Step S55.

If a doc_ref attribute value is not stored in Step S56, a notification message prepared in accordance with the set message type is sent to the destination address (Step S57). Notifying a newly registered document without providing the URI of the document is inconvenient for a user since it is difficult to locate the newly registered document. In such case in which a URI cannot be provided, the title of the document may be notified, such as the title element 202 illustrated in FIG. 2. Moreover, the URL of the document sent to the server device 101 in Step S54 may be determined and added. In this way, even without a doc_ref attribute, the user who has been notified about a registration or an update of the document can access the document according to the notified URL.

After sending the notification message, the process returns to Step S55 and the controlling unit 113 determines whether a subsequent destination address is stored in the mailed_to table. Through this loop process, all of the mailed_to destination addresses are processed. The controlling unit 113 determines whether or not all of the mailed_to destination addresses have been processed. If there were no mailed_to destination addresses to start out with (no in Step S55), the controlling unit 113 determines whether a destination address is stored in the mailed_to_with_document type table (Step S59 of FIG. 10).

If the mailed_to_with_document type table includes a destination address, then the controlling unit 113 determines whether a doc_ref attribute value is stored together with the destination address (Step S60). If so, the doc_ref attribute value, i.e., the URI, is added to a notification message prepared in accordance with the set message type and is sent together with the document stored in Step S54 to the destination address in process (Step S62). Then the process returns to Step S59. The document is sent as an attachment of the e-mail message.

If doc_ref attribute value is not found in Step S60, the notification message prepared in accordance with the set message type is sent together with the document stored in Step S54 to the destination address in process (Step S61). As described above, instead of a doc_ref attribute, a title or a URL may be added to the notification message.

After the notification message is sent together with the document, the process is returned to Step S59 and the controlling unit 113 determines whether a subsequent destination address is stored. Through this loop process, all of the mailed_to_with_document destination addresses are processed. The controlling unit 113 determines whether all of the mailed_to_with_document destination addresses have been processed. If there were no mailed_to_with_document destination addresses to start out with (no in Step S59), the process is ended.

The client device 106 according to the second embodiment of the present invention obtains destination information included in a document and sends a notification message about a registration or an update of a document to the destination addresses obtained from the destination information. Accordingly, when processing a document, destination information for notifying a registration or an update of the document can be processed together.

Third Embodiment

The server device 101 according to the third embodiment of the present invention is capable of confirming whether or not a predetermined portion of a document has been updated and notifying a destination if the predetermined portion is updated. FIGS. 11-15 are a flow chart illustrating a process carried out by the server device 101 according to the third embodiment. This processing program is stored in the storage medium 102 in the server device 101 and is executed by the controlling unit 103 in the server device 101.

The controlling unit 103 in the server device 101 receives a document from the client device 106 via the network I/F 104 (Step S71) and analyzes the received document (Step S72). The controlling unit 103 determines whether or not the received document is an XML document. If the document is an XML document, tagged data, elements, and attribute values included in the XML document are analyzed in accordance with the XML standards.

The controlling unit 103 determines whether unprocessed destination information is included in the document being analyzed (Step S73). For example, for the document illustrated in FIG. 2, when the controlling unit 103 finds a mailed_to elements or a mailed_to_with_document element in the notification element, the controlling unit 103 determines that the document being analyzed includes destination information. If destination information is included in the notification element, the destination address is stored in a table in the storage medium 102 (Step S74).

FIG. 16 is a table showing destination information. Each destination address entry in this table has an area for storing the type of the message, the doc_ref attribute value, and if_updated attribute values. The message type is mailed_to or mailed_to_with_document. This table is a combination of the tables according to the first embodiment shown in FIGS. 6 and 7. The table according to the third embodiment, however, does not necessarily to conform to this format.

The table may have a format the same as the format of the table in FIG. 6 or 7. Moreover, the tables according to the first and second embodiments may have the same format as the table in FIG. 16.

After completing Step S74, the type of the element including the destination information (i.e., mailed_to or mailed_to_with_document) are stored in the table (Step S75). Then the controlling unit 103 determines whether the elements including destination information include a doc_ref attribute (Step S76). If a doc_ref attribute is included, the doc_ref attribute value is stored in the table (Step S77). If a doc_ref attribute is not found, Step S77 is omitted and the process proceeds to Step S78.

Then the controlling unit 103 determines whether an if_updated attribute is included in the elements including the destination information (Step S78). Here, the if_updated attribute identifies a predetermined portion of the document. If the portion identified by the if_updated attribute is updated, a request for sending a notification to the destination address is made. According to this embodiment, the if_updated attribute is expressed by using XPointer and XLink, which are XML-related standards. The mailed_to elements 212 and 213 in FIG. 2 use XPointer. The mailed_to element 214 in FIG. 2 uses XLink.

The if_updated attribute value "#introduction" included in the mailed_to element 212 indicates an element having an id attribute "introduction," i.e., the chapter element 203. More specifically, the if_updated attribute value request a notification to be sent to the destination address when the content of the chapter element 203 is changed.

The if_updated attribute value "#xpointer(/doc/chapter[2]/range-to(/doc/chapter[3]))" included in the mailed_to element 213 indicates the second and third chapter element, i.e., the chapter elements 204 and 205.

The if_updated attribute value "resource" included in the mailed_to element 214 indicates that XLink is used to specify the updated portion. More specifically, the updated portion is identified by the XLink specification included between the start tag and the end tag of an element, which in this case is the relative URI "img/sample1.jpg." Here, an img element 206 includes the same URI "img/sample1.jpg." Accordingly, the server device 101, which has checked the mailed_to element 214, is instructed to check whether or not the content of the URI specified in the img element 206 has been updated. By using XLink, in addition to the update of a file, the update of any resource linked to the file can be checked.

Although not shown in FIG. 2, it is possible to include a plurality of if_updated attributes in one element. In such a case, a plurality of document portions (or resource portions) will be related to one destination. However, for example, taking into consideration the format of the mailed_to element 214, it is impossible to specify a plurality of resources by including a plurality of if_updated attributes having the attribute value "resource" in the mailed_to element 214. This is because it becomes unclear which if_updated attribute corresponds to which URI specified by XLink. Therefore, to relate a plurality of if_updated attributes having the attribute value "resource" to one destination address, a plurality of mailed_to elements or mailed_to_with_document elements may be related to the same destination address.

If an if_updated attribute is found elements in Step S78, all if_updated attributes included in the elements including destination information are stored (Step S79). Then, the controlling unit 103 determines whether any of the if_updated attribute values are "resource" (Step S80). If if_updated attribute value "resource" is found, the xlink:href attribute value, i.e., the URI, included in the element is stored (Step S81). If an if_updated attribute value "resource" is not found in Step S80, Step S81 is omitted and the process proceeds to Step S82. If an if_updated attribute is not found in Step S78, Steps S79 to S81 are omitted and the process proceeds to Step S82.

Upon completion of the above-described process related to the elements including destination information, the subsequent element including destination information is obtained from the document (Step S82). Then the process returns to Step S73 and the elements are processed. Through this loop process, all of the elements including destination information are processed.

Figure 12:
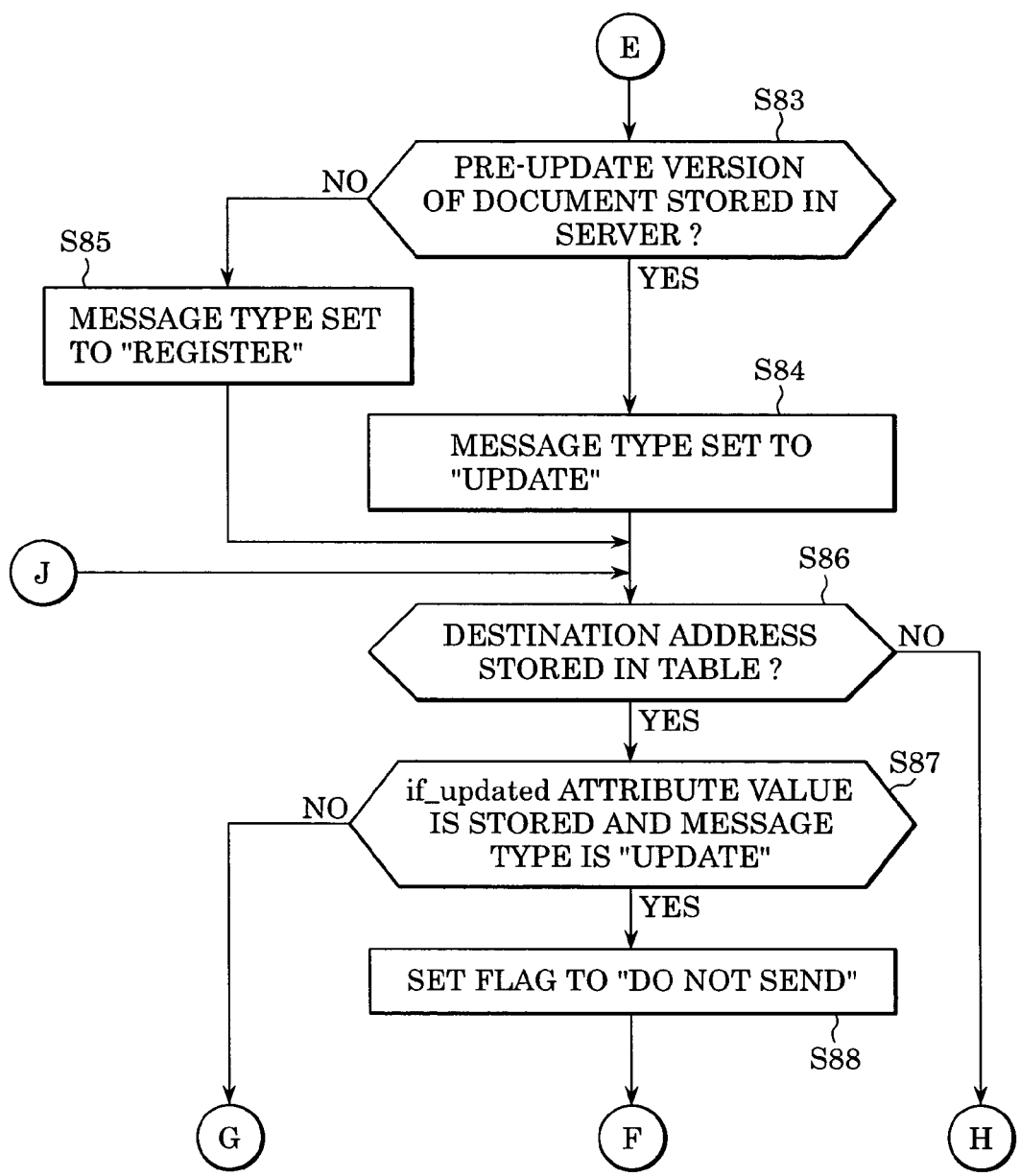
Figure 13:
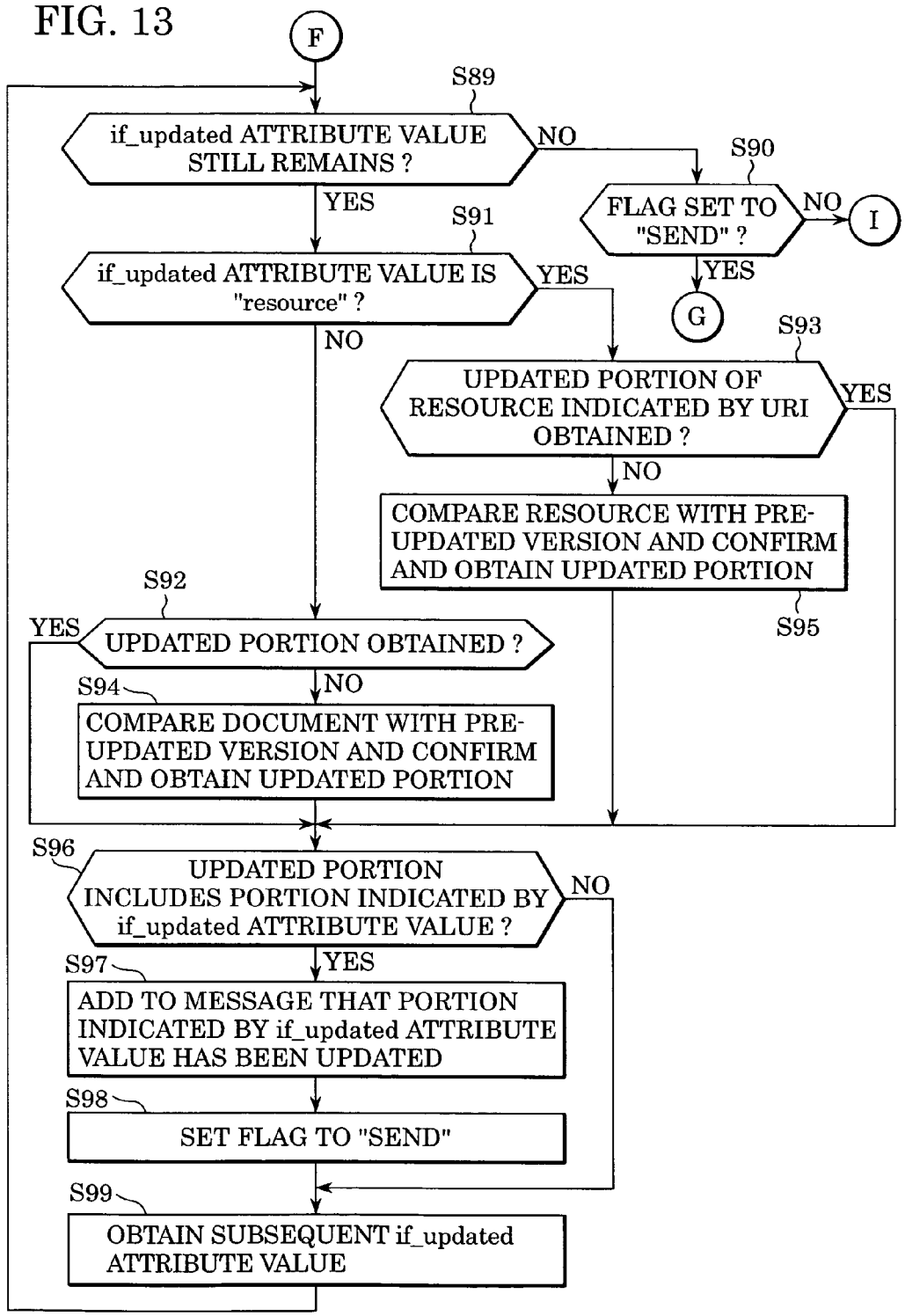

When the processing for all of the elements are completed in Step S73, the controlling unit 103 determines whether a pre-update version of the document is stored in the storage medium 102 (Step S83 of FIG. 12). If a pre-update version of the document is not stored in the storage medium 102, the process is recognized as a registration process of the document and the type of the notification message to be sent later in the process is set as "registration" (Step S85). If a pre-update version of the document is stored in the storage medium 102, the process is recognized as an update of the document and the type of the notification message to be sent later in the process is set as "update" (Step S84).

The controlling unit 103 determines whether a destination address is stored in the table of FIG. 16 (Step S86). If at least one destination address is stored, the controlling unit 103 determines whether at least one if_updated attribute value is stored in the table and whether or not the type of the message is "update" (Step S87). If at least one if_updated attribute value is stored and the type of the message is "update," a flag is initialized and set to "do not send" (Step S88).

The if_updated attribute values are processed one at a time. The first if_updated attribute value is obtained from the table, and then the controlling unit 103 determines whether another if_updated attribute value is included in the table (Step S89 of FIG. 13). To process the first if_updated attribute value, the process proceeds to Step S91. The controlling unit 103 determines whether the if_updated attribute value is "resource" (Step S91). It the if_updated attribute value is not "resource," the controlling unit 103 determines whether or not the updated portion of the document has already been obtained (Step S92).

If the updated portion of the document has not been obtained yet, the document is compared with the pre-update version of the document to obtain the updated portion of the document (Step S94). For example, in an XML document, each element in the document is compared with each element in the pre-update version of the document and the elements that have been updated are recorded. If the updated portions have already been obtained in Step S92, the documents do not have to be compared, and thus Step S94 is omitted and the process proceeds to Step S96.

If, in Step S91, the if_updated attribute value is "resource," the controlling unit 103 determines whether the updated portion of the resource indicated by the URI specified by XLink has been obtained (Step S93). If the updated portion of the resource has not yet been obtained, the resource is compared with the pre-update version and the updated portion is obtained (Step S95). If the updated portion of the resource has already been obtained in Step S93, the resources do not have to be compared, and thus Step S95 is omitted and the process proceeds to Step S96.

Comparison of the resources will be described with reference to the mailed_to element 214 in FIG. 2 as an example. The mailed_to element 214 includes the URI "img/smple1.jpg." The controlling unit 103 in the server device 101 obtains the resource specified by the URI from the client device 106 using a predetermined protocol. Then, the controlling unit 103 compares the resource with the "image/sample1.jpg" stored in the storage medium 102 in the server device 101. Since, in this case, the resource is a JPEG image, it is not very meaningful to find the updated portion. However, whether or not at least a part of the resource has been updated can be determined. It is also possible to identify another XML document as a resource. In such a case, the updated portion of the resource can be obtained in the same manner as Step S94.

After obtaining the updated portion of the resource, the controlling unit 103 determines whether the obtained updated portion includes the portion indicated by the if_updated attribute value in the document (Step S96). If such a portion is included, a notification message notifying that the portion indicated by the if_updated attribute value has been updated is added to the message to be sent later (Step S97).

For example, if the controlling unit 103 determines that the chapter element 203 is updated while processing the destination address "sasaki@hijk.com," listed in FIG. 16, a message "chapter "introduction" is updated" is added to the notification message (Step S97). Then a flag is set to "send" (Step S98). If any of the if_updated attributes identifies the updated portion, the flag is changed to "send."

Upon completion of the above-described processing of the if_updated attribute, the subsequent if_updated attribute value is obtained (Step S99) and the process is returned to Step S89 to repeat the process. Through this loop process, all if_updated attributes are processed. After all if_updated attributes are processed, the controlling unit 103 determines whether the flag is set as "send" (Step S90).

If the flag is not set as "send," a notification message is not sent because none of the if_updated attributes identifies an updated portion. Then the subsequent destination address is obtained from the table (Step S106 of FIG. 14). The process is then returned to Step S86 to repeat the process. If the flag is set to "send," the process proceeds to Step S100 (FIG. 14) and the subsequent steps to send a notification message. If, in Step S87, an if_updated attribute value corresponding to a destination address is not stored or if the type of the message is "registration," a notification message is always sent. Therefore, in such a case, the process proceeds to Step S100 and the subsequent steps to send a notification message.

The controlling unit 103 refers to the table in FIG. 16 and determines whether or not an if_updated attribute value of a destination address is stored (Step S100). If an if_updated attribute value is stored, the if_updated attribute value, i.e., the URI, is added to the message (Step S101). If an if_updated attribute value is not stored, Step S101 is omitted and the process proceeds to Step S102.

Then the controlling unit 103 determines whether or not the type of the destination address is mailed_to_with_document (Step S102). If the type of the destination address is mailed_to_with_document, the content of the document is added to the notification message (Step S103). If the type of the destination address is mailed_to, the content of the document is not added to the message.

The controlling unit 103 adds information to the message indicating that the document has been updated or registered in accordance with the type of the notification message (Step S104). This notification message is then sent to the destination address (Step S105). Upon completion of the process of the destination address, the subsequent destination address is obtained from the table (Step S106), and the process is returned to Step S86.

Through this loop process, all destination addresses are processed. After all destination addresses are processed (no in Step S86), the controlling unit 103 in the server device 101 stores the document in a predetermined area in the storage medium 102 (Step S107 of FIG. 15). If there is another document linked to the document, the location of this linked document is also stored in the storage medium 102 (Step S108). Then the process is ended.

The above-described process according to the third embodiment was carried out by the server device 101. However, the process may be carried out by the client device 106 in the same manner as the client device 106 according to the second embodiment.

In the processes according to the first and third embodiments, the server device 101 analyzes the document immediately after the document is input. However, the timing of analyzing the document is not limited to this. For example, the controlling unit 103 of the server device 101 may carry out the Step S2 and the subsequent steps in FIG. 3 or the Step S72 and the subsequent steps in FIG. 11 in predetermined time intervals measured with a timer. In this way, the controlling unit 103 can check whether or not the document is registered or updated at a time other than immediately after the input of the document.

In this case, to determine whether or not a document is registered, the controlling unit 103 of the server device 101 only needs to be able to determine the location for registered documents. In this way, the controlling unit 103 can recognize a newly registered document by periodically checking this location. To determine whether or not a document is updated, the pre-update version of the document may be stored under a document name different from the name of the document in process in the storage medium 102. The document in process and the document stored with a different document name are compared during the periodic check. If the updated portion of the document does not have to be specified, the time and date of the last update of the document obtained during the last checked may be stored. Then, during the subsequent periodic check, the time and date of the update of the document and the stored time and date of the last update of the document may be compared.

In this way, the step of inputting the document and the step of comparing the document with a pre-update version of the document can be separated. Hence, each step is executable by a different application. For example, a document file stored in the server device 101 may be updated by the client device 106 using a network file system (NFS) protocol. In such a case, the updated portion of the document can be specified during a periodic check carried out by the server device 101. Accordingly, the client device 106 does not have to start-up a special application but only has to edit the document to send a notification message about the update to the destination addresses. Moreover, the destination addresses do not have to be input every time a notification message is sent.

According to the above-described embodiments, a document is sent between and stored in the server device 101 and the client device 106. The present invention, however, is not limited to this structure, and, various devices, such as the server device 101, the client device 106, the mobile phone 108, the PC 109, the PDA 110, shown in FIG. 1, or a combination of these devices may be used to realize the functions of the present invention.

The present invention is not limited to the above-described embodiments, and so long as the functions according to the aspects and embodiments of the present invention are provided, the present invention may be realized by employing any structure.

For example, although hardware is included in the present invention, the functions of the present invention can be realized by programs operating in various devices. Therefore, it is possible to realize the present invention by executing a software program for realizing the above-described function and by reading out and executing a program code stored in a storage medium.

More specifically, the present invention can be realized by supplying a storage medium that stores software program code for realizing the functions according to the above-described embodiments of the present invention to a system or an apparatus and by reading out and executing the program code stored in the storage medium by the system or a computer (central processing unit (CPU) and a microprocessor unit (MPU)) of the apparatus.

In such a case, the program code read out from the storage medium realizes the function of the above-described embodiments of the present invention.

The storage medium for storing the program code may be, for example, a ROM, a memory card, a hard disk, a micro digital audio tape (DAT), a magneto-optic disk, an optical disk, such as a compact disk-recordable (CD-R) or a compact disk-rewritable (CD-RW), or a phase-changing optical disk, such as a digital versatile disk (DVD). Moreover, the program code may be downloaded via a network.

The functions of the embodiments of the present invention are realized not only by executing program code read out by a computer but also are realized when an operating system (OS) operating on the computer carries out the entire processing or part of the processing based on the program code.

Also, the embodiments of the present invention can be realized by a CPU included in an expansion board or expansion unit carrying out the entire processing or part of the processing based on the program code read out from the storage medium and stored in a memory included in an expansion board of a computer or an expansion unit connected to a computer.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-169154 filed Jun. 07, 2004, which is hereby incorporated by reference herein.

What is claimed is:

1. A document-processing apparatus comprising:
a central processing unit (CPU) configured to analyze a XML document having destination information embedded therein;
a storage device;
a destination-obtaining unit included in the CPU and configured to obtain the destination information from the analyzed XML document, wherein the destination information indicates a destination where to notify changes implemented by CPU in the analyzed XML document;
a determining unit included in the CPU and configured to determine whether a pre-update version of the analyzed XML document is stored in the storage device;
a comparing unit included in the CPU and configured to compare each element in the analyzed XML document with each element in the pre-update version of the analyzed XML document for detecting the changes in the analyzed XML document, if the determination unit determines that the pre-update version of the analyzed XML document is stored in the storage device; and
a notification unit included in the CPU and configured to a send an e-mail to the destination indicated by the obtained destination information, wherein the e-mail includes a notification about a registration or an update of the analyzed XML document,
wherein the notification unit is configured to notify the destination about the update of the analyzed XML document when the determining unit determines that the pre-update version of the analyzed XML document has been stored in the storage device, and wherein the notification unit is configured to notify the destination about the registration of the analyzed XML document when the determining unit determines that the pre-update version of the analyzed XML document is not stored in the storage device.

2. The document-processing apparatus according to claim 1, further comprising:

a notification-condition obtaining unit configured to obtain a notification condition for notifying the destination embedded in the analyzed XML document; and a condition-determining unit configured to determine whether an updated portion of the analyzed XML document determined by comparing the analyzed XML document to the pre-update version of the analyzed XML document satisfies the notification condition for notifying the destination;

wherein the notification unit is configured to notify the destination when the condition-determining unit determines that the notification condition has been satisfied.

3. The document-processing apparatus according to claim 2, wherein the notification condition is that the updated portion of the analyzed XML document is a file linked to the analyzed XML document.

4. The document-processing apparatus according to claim 2, wherein the notification condition is that the updated portion of the analyzed XML document is a range indicated in the analyzed XML document.

5. A method for processing a XML document using a document-processing apparatus, the method comprising steps of:

analyzing a XML document having destination information embedded therein;

obtaining the destination information from the analyzed XML document, wherein the destination information indicates where to notify changes in the analyzed XML document;

determining whether a pre-update version of the analyzed XML document is stored in a storage device included in the document processing apparatus;

comparing each element in the analyzed XML document with each element in the pre-update version of the analyzed XML document for detecting the changes in the analyzed XML document, if the determining step determines that the pre-update version of the analyzed XML document is stored in the storage device; and notifying the destination indicated by the obtained destination information about a registration or an update of the analyzed XML document, wherein the analyzing, the obtaining, the determining, the comparing and the notifying are executed by a central processing unit (CPU) included in the document-processing apparatus, wherein the destination is notified about the update of the analyzed XML document in the notifying step when the pre-update version of the analyzed XML document is determined to be stored in the storage device in the determining step, and wherein the destination is notified about the registration of the analyzed XML document in the notifying step when the pre-update version of the analyzed XML document is determined not to be stored in the storage device in the determining step.

6. The method for processing a document according to claim 5, further comprising steps of:

obtaining a notification condition for notifying the destination embedded in the analyzed XML document; and determining whether an updated portion of the analyzed XML document determined by comparing the analyzed XML document to the pre-update version of the analyzed XML document satisfies the notification condition for notifying the destination;

wherein the destination is notified about the update of the analyzed XML document when the notification condition has been determined to satisfy the notification condition in the determining step.

7. The method for processing a document according to claim 6, wherein the notification condition is that the updated portion of the analyzed XML document is a file linked to the analyzed XML document.

8. The method for processing a document according to claim 6, wherein the notification condition is that the updated portion of the analyzed XML document is a range indicated in the analyzed XML document.

9. A computer-readable storage medium storing a document processing program for causing a document-processing apparatus to carry out a method for processing a document, the method comprising:

analyzing a XML document having destination information embedded therein;

obtaining the destination information from the analyzed XML document, wherein the destination information indicates where to notify changes in the analyzed document;

determining whether a pre-update version of the analyzed XML document is stored in a storage device included in the document processing apparatus;

comparing each element in the analyzed XML document with each element in the pre-update version of the analyzed XML document for detecting the changes in the analyzed XML document, if the determining step determines that the pre-update version of the analyzed XML document is stored in the storage device; and notifying the destination indicated by the obtained destination information about a registration or an update of the analyzed XML document, wherein the analyzing, the obtaining, the determining, the comparing and the notifying are executed by a central processing unit (CPU) included in the document-processing apparatus, wherein the destination is notified about the update of the analyzed XML document in the notifying step when the pre-update version of the analyzed XML document is determined to be stored in the storage device in the determining step, and wherein the destination is notified about the registration of the analyzed XML document in the notifying step when the pre-update version of the analyzed XML document is determined not to be stored in the storage device in the determining step.

10. The computer-readable storage medium storing the document processing program according to claim 9, wherein the method further comprises:

obtaining a notification condition for notifying the destination embedded in the analyzed XML document; and determining whether the updated portion of the analyzed XML document determined by comparing the analyzed XML document to the pre-update version of the analyzed XML document satisfies the notification condition for notifying the destination;

wherein the destination is notified about the update of the analyzed XML document when the notification condition has been determined to satisfy the notification condition in the determining step.

11. The computer-readable storage medium storing the document processing program according to claim 10, wherein the notification condition is that the updated portion of the analyzed XML document is a file linked to the analyzed XML document.

12. The computer-readable storage medium storing the document processing program according to claim 10, wherein the notification condition is that the updated portion of the analyzed XML document is a range indicated in the analyzed XML document.

13. The document-processing apparatus according to claim 1, wherein the destination-obtaining unit further obtains attribute information from the analyzed XML document, and the notification unit notifies the destination of the update of the analyzed XML document based on the attribute information obtained.

14. The method for processing a document according to claim 5, wherein the obtaining step further obtains attribute information from the analyzed XML document, and the notifying step notifies the destination of the update of the analyzed XML document based on the attribute information obtained.

15. The computer-readable storage medium storing the document processing program according to claim 9, wherein the obtaining step further obtains attribute information from the analyzed XML document, and the notifying step notifies the destination of the update of the analyzed XML document based on the attribute information obtained.

* * * * *